(12) United States Patent
Oshibe et al.

(10) Patent No.: US 12,264,784 B2
(45) Date of Patent: Apr. 1, 2025

(54) PORTABLE CARGO HANDLING EQUIPMENT FOR LIQUID HYDROGEN

(71) Applicant: KAWASAKI JUKOGYO KABUSHIKI KAISHA, Kobe (JP)

(72) Inventors: Takako Oshibe, Kobe (JP); Tsutomu Ono, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 24 days.

(21) Appl. No.: 18/269,399

(22) PCT Filed: Dec. 22, 2021

(86) PCT No.: PCT/JP2021/047584
§ 371 (c)(1),
(2) Date: Jun. 23, 2023

(87) PCT Pub. No.: WO2022/138723
PCT Pub. Date: Jun. 30, 2022

(65) Prior Publication Data
US 2024/0133523 A1   Apr. 25, 2024
US 2024/0230031 A9   Jul. 11, 2024

(30) Foreign Application Priority Data
Dec. 25, 2020   (JP) .................................. 2020-217762

(51) Int. Cl.
*F17C 5/02*   (2006.01)
(52) U.S. Cl.
CPC ........ *F17C 5/02* (2013.01); *F17C 2205/0332* (2013.01); *F17C 2205/0364* (2013.01);
(Continued)

(58) Field of Classification Search
CPC ................ F17C 5/02; F17C 2205/0332; F17C 2205/0364; F17C 2221/012;
(Continued)

(56) References Cited

U.S. PATENT DOCUMENTS 4,887,857 A * 12/1989 VanOmmeren ......... F17C 13/02
141/82
5,305,805 A * 4/1994 Watkins, Jr. .......... B60P 3/2265
280/4

(Continued)

FOREIGN PATENT DOCUMENTS

JP   S50-139421 A   11/1975
JP   S62-237199 A   10/1987

(Continued)

*Primary Examiner* — Timothy L Maust
(74) *Attorney, Agent, or Firm* — Oliff PLC (57) ABSTRACT

Portable cargo handling equipment for liquid hydrogen is portable cargo handling equipment for liquid hydrogen which transfers the liquid hydrogen stored in a land-side cryogenic tank to a ship-side cryogenic tank. The portable cargo handling equipment includes: a liquid hydrogen pipe through which the liquid hydrogen is guided and which includes a first joint connectable to an end portion of a ship-side liquid pipe extending from the ship-side cryogenic tank and a second joint connectable to an end portion of a land-side liquid pipe extending from the land-side cryogenic tank; a first emergency release coupling located at the liquid hydrogen pipe; a hydrogen gas pipe through which a hydrogen gas generated by evaporation of the liquid hydrogen is guided and which includes a third joint connectable to an end portion of a ship-side gas pipe extending from the ship-side cryogenic tank; a second emergency release coupling located at the hydrogen gas pipe; and a vent pipe including one end connected to the hydrogen gas pipe and the other end that is open to an atmosphere.

10 Claims, 7 Drawing Sheets

(52) U.S. Cl.
CPC *F17C 2221/012* (2013.01); *F17C 2223/0161* (2013.01); *F17C 2265/061* (2013.01); *F17C 2270/0105* (2013.01); *F17C 2270/0171* (2013.01)

(58) Field of Classification Search
CPC ........ F17C 2223/0161; F17C 2265/061; F17C 2270/0105; F17C 2270/0171
See application file for complete search history.

(56) References Cited

U.S. PATENT DOCUMENTS

| | | |
|---|---|---|
| 2018/0195671 A1 | 7/2018 | Unno et al. |
| 2018/0202608 A1 | 7/2018 | Unno et al. |

FOREIGN PATENT DOCUMENTS

| | | |
|---|---|---|
| JP | 2020-104830 A | 7/2020 |
| WO | 2016/051768 A1 | 4/2016 |
| WO | 2017/010082 A1 | 1/2017 |
| WO | 2017/010095 A1 | 1/2017 |
| WO | 2019/038364 A2 | 2/2019 |

* cited by examiner

PORTABLE CARGO HANDLING EQUIPMENT FOR LIQUID HYDROGEN

CROSS-REFERENCE TO RELATED APPLICATIONS

This is a national phase application of PCT/JP2021/047584 filed on Dec. 22, 2021, claiming priority to Japanese Patent application No. 2020-217762 filed on Dec. 25, 2020, the contents of which are incorporated herein by reference.

TECHNICAL FIELD

The present disclosure relates to portable cargo handling equipment for liquid hydrogen which transfers the liquid hydrogen from a land-side cryogenic tank to a ship-side cryogenic tank.

BACKGROUND ART

As equipment that handles a cryogenic fluid between a ship-side cryogenic tank and a land-side cryogenic tank, PTL 1 discloses a movable body including a fluid flow pipe through which LNG flows between the land-side cryogenic tank and the ship-side cryogenic tank, in order to improve the degree of freedom related to geographical restriction when handling the cryogenic fluid.

This movable body includes a pump, pressurizes a liquefied cryogenic fluid discharged from the land-side cryogenic tank, and supplies the fluid by pressure to the ship-side cryogenic tank through the fluid flow pipe. Moreover, this movable body includes: an emergency shutoff valve that shuts off the flow of the fluid in the fluid flow pipe between a ship and cargo handling equipment; and an emergency release coupling (ERC) that separates the ship and the cargo handling equipment from each other in an emergency. For example, when the ship moves due to a sudden blast of wind during the handling of the cryogenic fluid, the emergency release coupling is uncoupled, and therefore, the ship and the cargo handling equipment are separated from each other.

CITATION LIST

Patent Literature

PTL 1: Japanese Laid-Open Patent Application Publication No. 2020-104830

SUMMARY OF INVENTION

Technical Problem

In the ship-side cryogenic tank that stores the liquid hydrogen, cryogenic hydrogen gas is generated by the evaporation of the liquid hydrogen. It is desired to discharge the hydrogen gas in the ship-side cryogenic tank to the atmosphere through equipment other than the ship.

An object of the present disclosure is to provide portable cargo handling equipment for liquid hydrogen which can discharge a hydrogen gas, generated by evaporation of the liquid hydrogen in a ship-side cryogenic tank, through equipment other than a ship to the atmosphere while the liquid hydrogen is transferred from a land-side cryogenic tank to the ship-side cryogenic tank.

Solution to Problem

In order to solve the above problems, portable cargo handling equipment for liquid hydrogen according to one aspect of the present disclosure is portable cargo handling equipment for liquid hydrogen which transfers the liquid hydrogen stored in a land-side cryogenic tank to a ship-side cryogenic tank. The portable cargo handling equipment includes: a liquid hydrogen pipe through which the liquid hydrogen is guided and which includes a first joint connectable to an end portion of a ship-side liquid pipe extending from the ship-side cryogenic tank and a second joint connectable to an end portion of a land-side liquid pipe extending from the land-side cryogenic tank; a first emergency release coupling located at the liquid hydrogen pipe; a hydrogen gas pipe through which a hydrogen gas generated by evaporation of the liquid hydrogen is guided and which includes a third joint connectable to an end portion of a ship-side gas pipe extending from the ship-side cryogenic tank; a second emergency release coupling located at the hydrogen gas pipe; and a vent pipe including one end connected to the hydrogen gas pipe and the other end that is open to an atmosphere.

Advantageous Effects of Invention

According to the present disclosure, while the liquid hydrogen is transferred from the land-side cryogenic tank to the ship-side cryogenic tank, the hydrogen gas generated by the evaporation of the liquid hydrogen in the ship-side cryogenic tank can be discharged to the atmosphere through equipment other than the ship.

DESCRIPTION OF EMBODIMENTS

Hereinafter, an embodiment of the present disclosure will be described with reference to the drawings.

Figure 1:
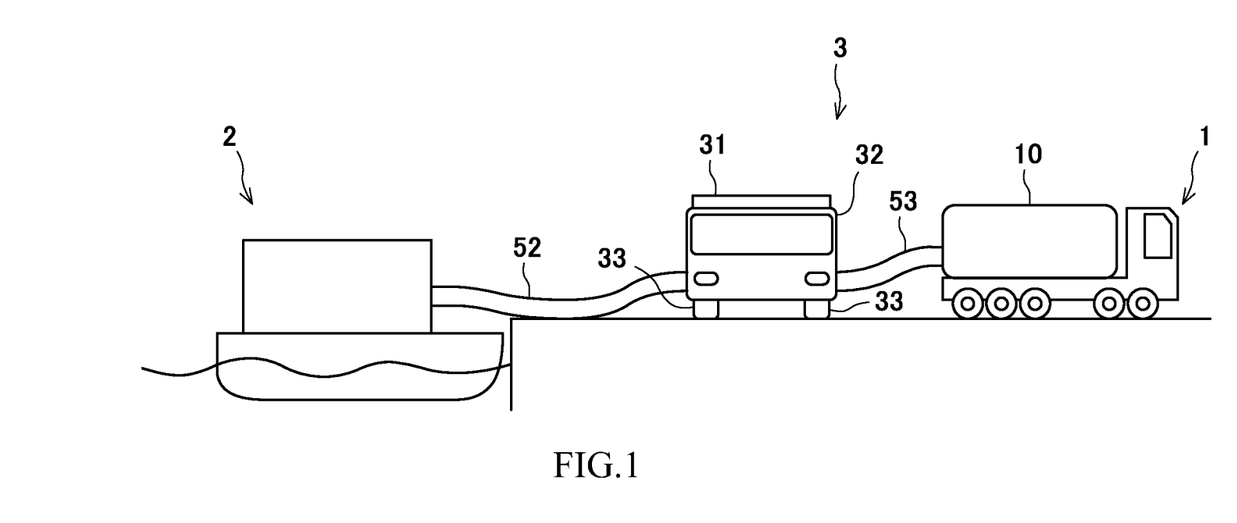
FIG. 1 is a diagram showing that portable cargo handling equipment according to an embodiment is connected to a land-side cryogenic tank and a ship-side cryogenic tank.

FIG. 1 is a diagram showing that portable cargo handling equipment 3 according to the embodiment is connected to a land-side cryogenic tank 10 and a ship-side cryogenic tank 20. In the present embodiment, the land-side cryogenic tank 10 is a tank that is a part of a tank truck 1. The land-side cryogenic tank 10 may be a tank that is a part of a tank container carried by a traveling vehicle, or the like. The ship-side cryogenic tank 20 is, for example, a fuel tank or a cargo tank mounted on a ship 2. The tank truck 1, the ship 2, and the portable cargo handling equipment 3 are included in a liquid hydrogen transfer system that transfers liquid hydrogen from the land-side cryogenic tank to the ship-side cryogenic tank.

The portable cargo handling equipment 3 is cargo handling equipment that transfers the liquid hydrogen from one of the land-side cryogenic tank 10 and the ship-side cryogenic tank 20 to the other. In the present embodiment, the portable cargo handling equipment 3 is a traveling vehicle including: a frame 31; a vehicle body 32 supporting the frame 31; and a traveling driving source that is supported by the vehicle body 32 and drives wheels supporting the vehicle body 32.

Figure 2A:
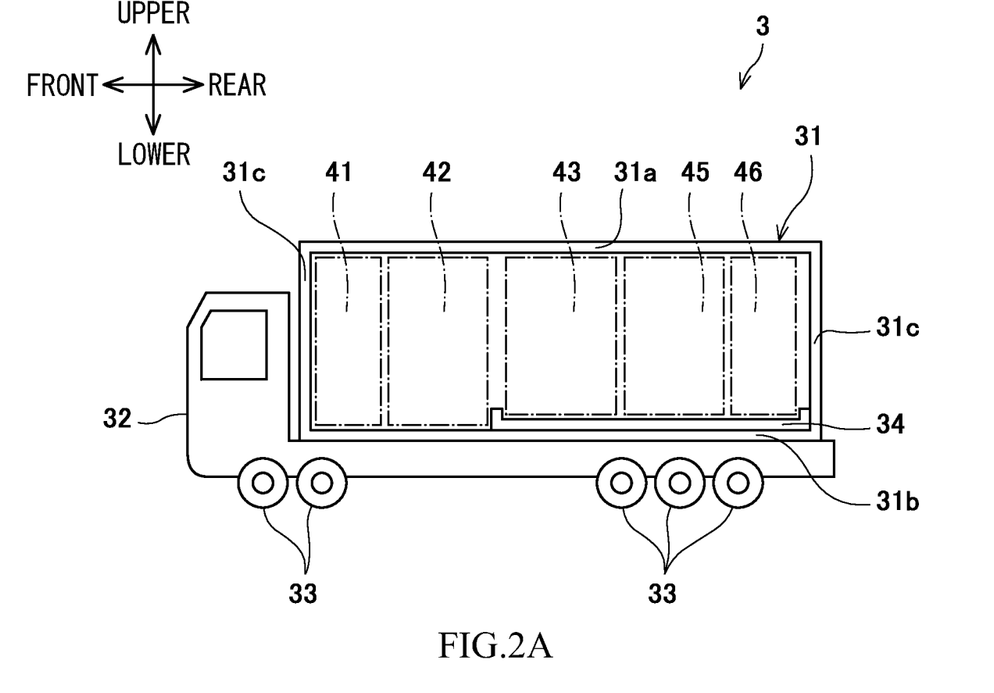
FIG. 2A is a schematic side view of the portable cargo handling equipment shown in FIG. 1.
Figure 2B:
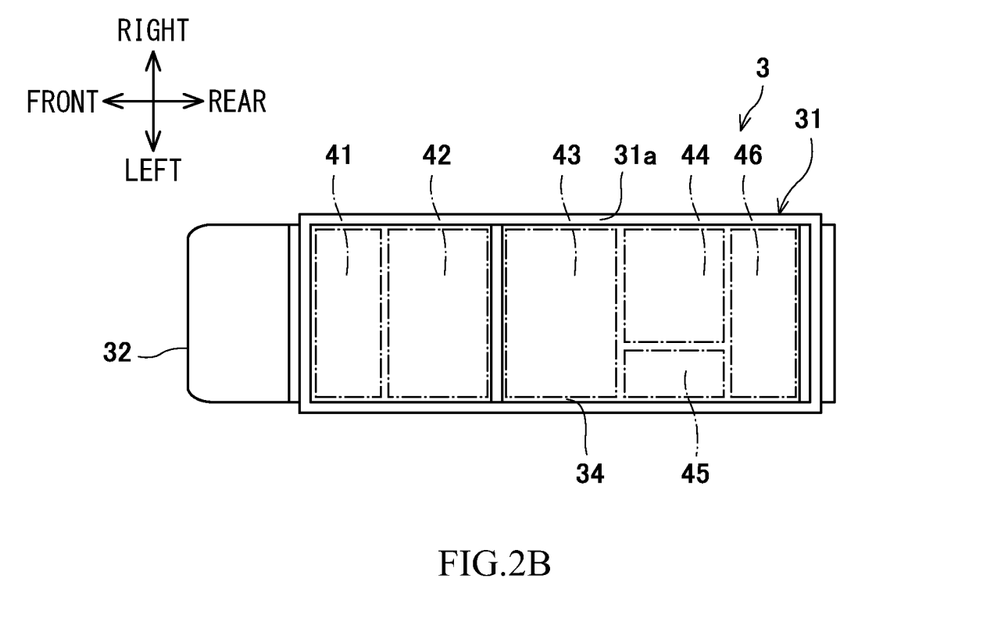
FIG. 2B is a schematic plan view of the portable cargo handling equipment shown in FIG. 1.

FIG. 2A is a schematic side view of the portable cargo handling equipment 3 shown in FIG. 1. FIG. 2B is a schematic plan view of the portable cargo handling equipment 3 shown in FIG. 1. The frame 31 supports various devices, pipes, and the like included in the portable cargo handling equipment 3. However, in FIGS. 2A and 2B, for simplicity, these devices and pipes are not shown. For convenience sake, directions mentioned in the following description are described based on a driver of the portable cargo handling equipment 3 that is a traveling vehicle. To be specific, front, rear, upper, lower, left, and right directions of the portable cargo handling equipment 3 respectively correspond to front, rear, upper, lower, left, and right directions of the vehicle body 32.

The frame 31 supports various devices, pipes, and the like included in the portable cargo handling equipment 3. For example, the frame 31 supports a below-described liquid hydrogen pipe 50 and a below-described hydrogen gas pipe 60, more specifically, supports a fixed liquid pipe 51 and a fixed gas pipe 61. The frame 31 and the devices and pipes supported by the frame 31 are integrated with each other. Therefore, the devices and pipes included in the portable cargo handling equipment 3 can be carried by carrying the frame 31.

The frame 31 is, for example, a container frame. More specifically, the frame 31 is a structural body which is formed by coupling extending members to have a substantially rectangular solid shape having a length in a front-rear direction which is longer than a length in a left-right direction and a length in an upper-lower direction. For example, the frame 31 may be a container frame for a 20-foot container having a length of 20 feet (about six meters) in the front-rear direction or may be a container frame for a 40-foot container.

The frame 31 includes a frame upper portion 31a, a frame lower portion 31b, and a frame post portion 31c. For example, the frame upper portion 31a includes: two front-rear direction extending members which are parallel to each other and extend in the front-rear direction; and two left-right direction extending members which respectively couple front end portions of the two front-rear direction extending members to each other and rear end portions of the two front-rear direction extending members to each other. For example, the frame lower portion 31b is substantially the same in shape and size as the frame upper portion 31a and includes two front-rear direction extending members and two left-right direction extending members. For example, the frame post portion 31c includes posts which extend in the upper-lower direction and couple the frame upper portion 31a and the frame lower portion 31b to each other.

In the following description, a region surrounded by the frame 31 is referred to as an internal region of the frame 31. The internal region of the frame 31 includes a vent pipe arrangement region 41, a hose arrangement region 42, an emergency release coupling arrangement region 43, a heating device arrangement region 44, a cylinder arrangement region 45, and an operating device arrangement region 46. The vent pipe arrangement region 41, the hose arrangement region 42, the emergency release coupling arrangement region 43, the heating device arrangement region 44, and the operating device arrangement region 46 are lined up in this order from the front side. In order that the operating device arrangement region 46 is located as far as possible from the vent pipe arrangement region 41, the vent pipe arrangement region 41 is located at a front most portion of the internal region of the frame 31, and the operating device arrangement region 46 is located at a rearmost portion of the internal region of the frame 31. Moreover, the heating device arrangement region 44 and the cylinder arrangement region 45 are lined up in the left-right direction. The devices and pipes located in the internal region of the frame 31 are supported by the frame 31.

Moreover, a liquid receiver 34 is located in the vicinity of lower portions of the emergency release coupling arrangement region 43, the heating device arrangement region 44, the cylinder arrangement region 45, and the operating device arrangement region 46. The devices and pipes located in the regions 41 to 46 and the liquid receiver 34 will be described later in detail.

Figure 3:
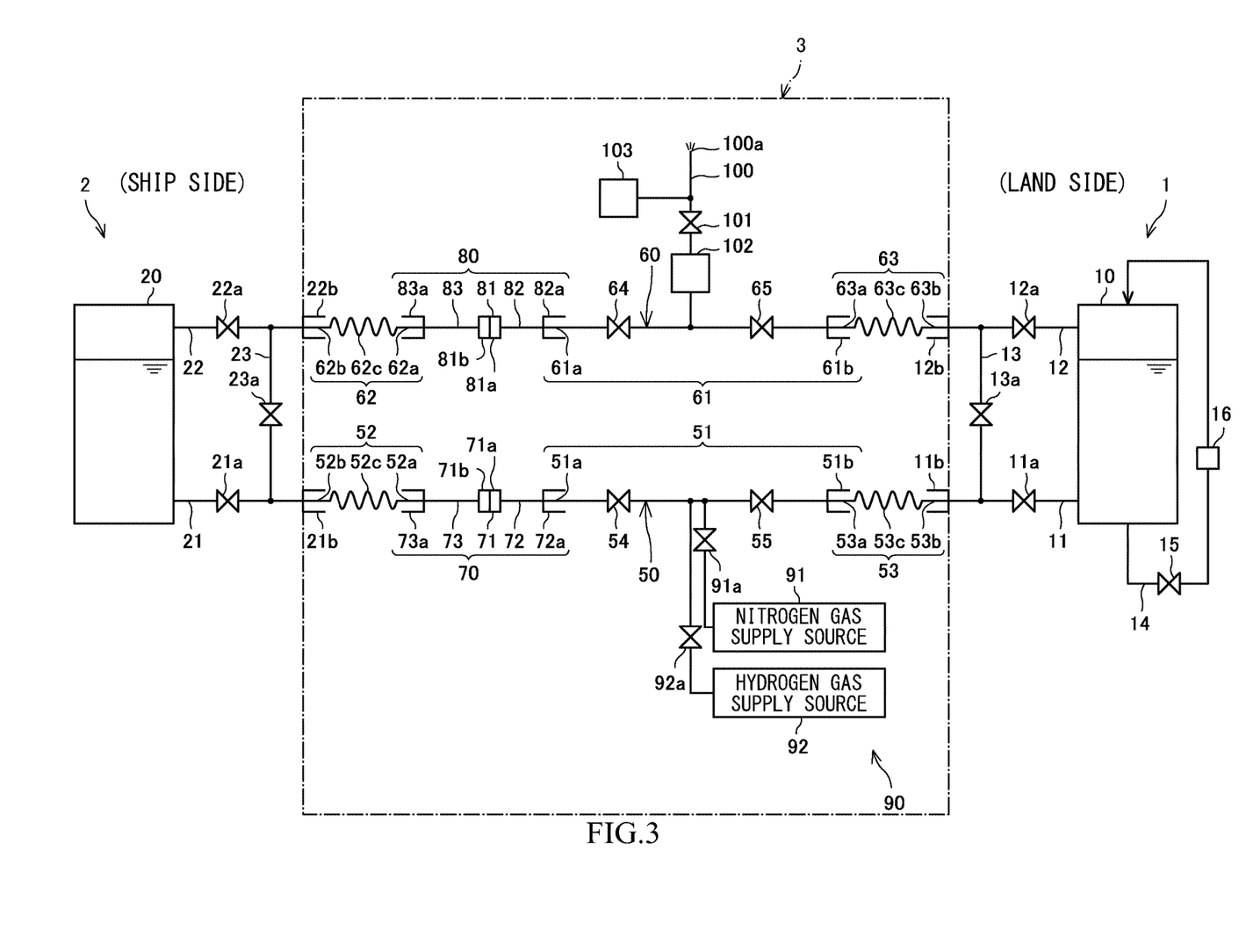
FIG. 3 is a piping system diagram of a liquid hydrogen transfer system shown in FIG. 1.

FIG. 3 is a piping system diagram of the liquid hydrogen transfer system shown in FIG. 1. In the following description, for convenience sake, a side of the piping system which is close to the land-side cryogenic tank 10 is referred to as a "land side," and a side of the piping system which is close to the ship-side cryogenic tank 20 is referred to as a "ship side."

The tank truck 1 includes: the land-side cryogenic tank 10; a land-side liquid pipe 11 extending from the land-side cryogenic tank 10; and a land-side gas pipe 12 extending from the land-side cryogenic tank 10.

The land-side liquid pipe 11 is connected to a lower portion of the land-side cryogenic tank 10. In the present embodiment, the land-side liquid pipe 11 is connected to a liquid phase portion of the land-side cryogenic tank 10 that stores the liquid hydrogen. A shutoff valve 11a is located at the land-side liquid pipe 11. Moreover, a joint 11b is located at an end portion of the land-side liquid pipe 11 which is opposite to the land-side cryogenic tank 10.

The land-side gas pipe 12 is connected to an upper portion of the land-side cryogenic tank 10. In the present embodiment, the land-side gas pipe 12 is connected to a gas phase portion of the land-side cryogenic tank 10 that stores the liquid hydrogen. A boil off gas closing valve 12a is located at the land-side gas pipe 12. Moreover, a joint 12b is located at an end portion of the land-side gas pipe 12 which is opposite to the land-side cryogenic tank 10.

Moreover, a portion of the land-side liquid pipe 11 which is located between the shutoff valve 11a and the joint 11b and a portion of the land-side gas pipe 12 which is located between the boil off gas closing valve 12a and the joint 12b are connected to each other by a land-side connection pipe 13. An on-off valve 13a is located at the land-side connection pipe 13. The land-side connection pipe 13 includes a passage through which a purge gas flows by a below-described purge gas supply device 90.

Moreover, the tank truck 1 includes a circulation pipe 14, an on-off valve 15, and an evaporator 16. An upstream end of the circulation pipe 14 is connected to the liquid phase portion of the land-side cryogenic tank 10, and a downstream end of the circulation pipe 14 is connected to the gas phase portion of the land-side cryogenic tank 10. The on-off valve 15 is located at the circulation pipe 14, and the evaporator 16 is located at a portion of the circulation pipe 14 which is located between the on-off valve 15 and the downstream end of the circulation pipe 14.

The circulation pipe 14, the on-off valve 15, and the evaporator 16 are included in a self-pressurizing pressure feed system. In this self-pressurizing pressure feed system, the liquid hydrogen guided from the land-side cryogenic tank 10 to the evaporator 16 through a portion of the circulation pipe 14 which is located upstream of the evaporator 16 is evaporated by the evaporator 16, and a hydrogen gas generated by the evaporation returns to the gas phase portion of the land-side cryogenic tank 10 through a portion of the circulation pipe 14 which is located downstream of the evaporator 16. Thus, the gas pressure of the gas phase portion of the land-side cryogenic tank 10 is set to be higher than the gas pressure of a gas phase portion of the ship-side cryogenic tank 20, and therefore, the liquid hydrogen is supplied by pressure from the land-side cryogenic tank 10 to the ship-side cryogenic tank 20.

The ship 2 includes: the ship-side cryogenic tank 20; a ship-side liquid pipe 21 extending from the ship-side cryogenic tank 20; and a ship-side gas pipe 22 extending from the ship-side cryogenic tank 20.

The ship-side liquid pipe 21 is connected to a lower portion of the ship-side cryogenic tank 20. In the present embodiment, the ship-side liquid pipe 21 is connected to a liquid phase portion of the ship-side cryogenic tank 20 that stores the liquid hydrogen. A shutoff valve 21a is located at the ship-side liquid pipe 21. Moreover, a joint 21b is located at an end portion of the ship-side liquid pipe 21 which is opposite to the ship-side cryogenic tank 20.

The ship-side gas pipe 22 is connected to an upper portion of the ship-side cryogenic tank 20. In the present embodiment, the ship-side gas pipe 22 is connected to the gas phase portion of the ship-side cryogenic tank 20 that stores the liquid hydrogen. A boil off gas closing valve 22a is located at the ship-side gas pipe 22. Moreover, a joint 22b is located at an end portion of the ship-side gas pipe 22 which is opposite to the ship-side cryogenic tank 20.

Moreover, a portion of the ship-side liquid pipe 21 which is located between the shutoff valve 21a and the joint 21b and a portion of the ship-side gas pipe 22 which is located between the boil off gas closing valve 22a and the joint 22b are connected to each other by a ship-side connection pipe 23. An on-off valve 23a is located at the ship-side connection pipe 23. The ship-side connection pipe 23 includes a passage through which the purge gas flows by the below-described purge gas supply device 90.

The portable cargo handling equipment 3 includes the liquid hydrogen pipe 50 and the hydrogen gas pipe 60. Each of the liquid hydrogen pipe 50 and the hydrogen gas pipe 60 may include, for example, a known double pipe structure or a single pipe structure around which a thermal insulator is wound. One end of the liquid hydrogen pipe 50 is connected to a ship-side end portion of the land-side liquid pipe 11, and the other end of the liquid hydrogen pipe 50 is connected to a land-side end portion of the ship-side liquid pipe 21. Moreover, one end of the hydrogen gas pipe 60 is connected to a ship-side end portion of the land-side gas pipe 12, and the other end of the hydrogen gas pipe 60 is connected to a land-side end portion of the ship-side gas pipe 22.

The liquid hydrogen pipe 50 includes the fixed liquid pipe 51, a first emergency release unit 70, a hose 52, and a hose 53. The hose 52 is one example of a first hose.

The fixed liquid pipe 51 is fixed to the frame 31 by a fixture 35. The fixed liquid pipe 51 is a pipe that is higher in rigidity than below-described flexible hose portions 52c and 53c. Joints 51a and 51b are respectively located at both ends of the fixed liquid pipe 51.

The first emergency release unit 70 includes a first emergency release coupling 71, a first pipe 72, and a second pipe 73. The first emergency release unit 70 is located in the emergency release coupling arrangement region 43. The first emergency release coupling 71 includes: a first unit 71a located at the land side; a second unit 71b located at the ship side; and a clamp 71c that separably connects the first unit 71a and the second unit 71b to each other. The first emergency release coupling 71 can be manually operated so as to be able to be uncoupled in accordance with the determination of an operator. Moreover, the first emergency release coupling 71 has a shutoff function that prevents a fluid from leaking when the first emergency release coupling 71 is uncoupled. Specifically, each of the first unit 71a and the second unit 71b includes therein an emergency shutoff valve. These emergency shutoff valves are switched from an open state to a closed state when the first emergency release coupling 71 is made to be uncoupled. The first emergency release unit 70 is a part of an emergency release system of the portable cargo handling equipment 3. The first emergency release unit 70 corresponds to a first emergency release assembly. Moreover, the first unit 71a corresponds to a first coupling, and the second unit 71b corresponds to a second coupling.

The first unit 71a is located at one end of the first pipe 72. A joint 72a connectable to the joint 51a of the fixed liquid pipe 51 is located at the other end of the first pipe 72. The joint 72a is one example of a fourth joint. The second unit 71b is located at one end of the second pipe 73. A joint 73a is located at the other end of the second pipe 73. The joint 73a is one example of a fifth joint.

At least a part of the hose 52 includes the flexible hose portion 52c. The flexible hose portion 52c is one example of a first flexible hose portion. A joint 52a connectable to the joint 73a of the second pipe 73 is located at one end of the hose 52. A joint 52b connectable to the joint 21b of the ship-side liquid pipe 21 is located at the other end of the hose 52. The joint 52b is one example of a first joint.

At least a part of the hose 53 includes the flexible hose portion 53c. A joint 53a connectable to the joint 51b of the fixed liquid pipe 51 is located at one end of the hose 53. A joint 53b connectable to the joint 11b of the land-side liquid pipe 11 is located at the other end of the hose 53. The joint 53b is one example of a second joint.

The hydrogen gas pipe 60 includes the fixed gas pipe 61, a second emergency release unit 80, a hose 62, and a hose 63. The hose 62 is one example of a second hose.

The fixed gas pipe 61 is fixed to the frame 31 by a fixture. The fixed gas pipe 61 is a pipe that is higher in rigidity than below-described flexible hose portions 62c and 63c. Joints 61a and 61b are respectively located at both ends of the fixed gas pipe 61.

The second emergency release unit 80 includes a second emergency release coupling 81, a third pipe 82, and a fourth pipe 83. The second emergency release unit 80 is located in the emergency release coupling arrangement region 43. The second emergency release coupling 81 includes: a third unit 81*a* located at the land side; and a fourth unit 81*b* located at the ship side and separably connected to the third unit 81*a* by a clamp. The second emergency release coupling 81 can be manually operated so as to be able to be uncoupled in accordance with the determination of the operator. Moreover, the second emergency release coupling 81 has a shutoff function that prevents a fluid from leaking when the second emergency release coupling 81 is uncoupled. Specifically, each of the third unit 81*a* and the fourth unit 81*b* includes therein an emergency shutoff valve. These emergency shutoff valves are switched from an open state to a closed state when the second emergency release coupling 81 is made to be uncoupled. The second emergency release unit 80 is a part of the emergency release system of the portable cargo handling equipment 3. The second emergency release unit 80 corresponds to a second emergency release assembly. Moreover, the third unit 81*a* corresponds to a third coupling, and the fourth unit 81*b* corresponds to a fourth coupling.

The third unit 81*a* is located at one end of the third pipe 82. A joint 82*a* connectable to the joint 61*a* of the fixed gas pipe 61 is located at the other end of the third pipe 82. The joint 82*a* is one example of a sixth joint. The fourth unit 81*b* is located at one end of the fourth pipe 83. A joint 83*a* is located at the other end of the fourth pipe 83. The joint 83*a* is one example of a seventh joint.

At least a part of the hose 62 includes the flexible hose portion 62*c*. The flexible hose portion 62*c* is one example of a second flexible hose portion. A joint 62*a* connectable to the joint 83*a* of the fourth pipe 83 is located at one end of the hose 62, and a joint 62*b* connectable to the joint 22*b* of the ship-side gas pipe 22 is located at the other end of the hose 62. The joint 62*b* is one example of a third joint.

At least a part of the hose 63 includes the flexible hose portion 63*c*. A joint 63*a* connectable to the joint 61*b* of the fixed gas pipe 61 is located at one end of the hose 63. A joint 63*b* connectable to the joint 12*b* of the land-side gas pipe 12 is located at the other end of the hose 63.

The fixed liquid pipe 51 and the fixed gas pipe 61 are always fixed to the frame 31. Moreover, the first emergency release unit 70 and the second emergency release unit 80 are respectively connected to the fixed liquid pipe 51 and the fixed gas pipe 61 to be fixed to the frame 31 except when maintenance is performed. On the other hand, while the portable cargo handling equipment 3 is moving, such as while the portable cargo handling equipment 3 is moving to a cargo handling site, the hose 52, the hose 53, the hose 62, and the hose 63 are respectively disconnected from the first emergency release unit 70, the fixed liquid pipe 51, the second emergency release unit 80, and the fixed gas pipe 61. For example, while the portable cargo handling equipment 3 is moving, the hose 52, the hose 53, the hose 62, and the hose 63 are located in the hose arrangement region 42.

A shutoff valve 54 is located at a portion of the liquid hydrogen pipe 50 which is located between the first emergency release coupling 71 and the joint 53*b*. Specifically, the shutoff valve 54 is located at the fixed liquid pipe 51.

Moreover, a purge gas closing valve 55 is located at a portion of the liquid hydrogen pipe 50 which is located at the land side of the shutoff valve 54. Specifically, the purge gas closing valve 55 is located at a portion of the fixed liquid pipe 51 which is located between the shutoff valve 54 and the joint 51*b*. Moreover, a purge gas closing valve 64 is located at the fixed gas pipe 61 of the hydrogen gas pipe 60. A purge gas closing valve 65 is located at a portion of the fixed gas pipe 61 which is located between the purge gas closing valve 64 and the joint 61*b*.

Each of the shutoff valve 54 and the purge gas closing valves 55, 64, and 65 is a manual operation valve that is manually operated by the operator. For example, each of the shutoff valve 54 and the purge gas closing valves 55, 64, and 65 includes an operating lever or an operating handle which is directly operated by the operator.

The shutoff valve 54 and the purge gas closing valves 55, 64, and 65 are located in the operating device arrangement region 46. More specifically, the shutoff valve 54 and the purge gas closing valves 55, 64, and 65 are located at positions which are located lower than a discharge port 100*a* of a vent pipe 100 and away by five meters or more in a horizontal direction from the discharge port 100*a* in a top view. Since the operating device arrangement region 46 is located at the rearmost portion of the internal region of the frame 31, the operator can easily access the shutoff valve 54 and the purge gas closing valves 55, 64, and 65.

The portable cargo handling equipment 3 further includes the purge gas supply device 90 that can selectively supply a nitrogen gas and a hydrogen gas as a purge gas to the liquid hydrogen pipe 50. Specifically, the purge gas supply device 90 includes a nitrogen gas supply source 91 and a hydrogen gas supply source 92. The nitrogen gas supply source 91 is, for example, a nitrogen gas cylinder, and a cylinder on-off valve 91*a* is located at a passage through which the nitrogen gas is supplied from the nitrogen gas supply source 91 to the liquid hydrogen pipe 50. The hydrogen gas supply source 92 is, for example, a hydrogen gas cylinder, and a cylinder on-off valve 92*a* is located at a passage through which the hydrogen gas is supplied from the hydrogen gas supply source 92 to the liquid hydrogen pipe 50. The nitrogen gas supply source 91 and the hydrogen gas supply source 92 are located in the cylinder arrangement region 45. The purge gas supply device 90 supplies the nitrogen gas or the hydrogen gas as the purge gas to a portion of the liquid hydrogen pipe 50 which is located between the shutoff valve 54 and the purge gas closing valve 55. The nitrogen gas supply source 91 and the hydrogen gas supply source 92 do not have to be located in the cylinder arrangement region 45 or do not have to be located in the internal region of the frame 31. The nitrogen gas supply source 91 and the hydrogen gas supply source 92 may be located outside the portable cargo handling equipment 3.

The portable cargo handling equipment 3 further includes the vent pipe 100. The vent pipe 100 discharges the hydrogen gas, guided from the ship-side cryogenic tank 20, to the atmosphere. Moreover, the vent pipe 100 discharges the purge gas, supplied from the purge gas supply device 90 to the liquid hydrogen pipe 50, to the atmosphere. The vent pipe 100 may have, for example, a known double pipe structure or a single pipe structure around which a thermal insulator is wound. One end of the vent pipe 100 is connected to the hydrogen gas pipe 60. More specifically, one end of the vent pipe 100 is connected to a portion of the fixed gas pipe 61 which is located between the purge gas closing valve 64 and the purge gas closing valve 65. Moreover, the discharge port 100*a* that is open to the atmosphere is located at the other end of the vent pipe 100.

The vent pipe 100 is located in the vent pipe arrangement region 41. For example, the vent pipe 100 is fixed to the frame 31 by a fixture. Only a part of the vent pipe 100 may be located in the vent pipe arrangement region 41. For example, a supporting portion that supports a lower portion of the vent pipe 100 may be located in the vent pipe arrangement region 41. In this case, the vent pipe 100 may extend upward from the supporting portion, and the discharge port 100*a* may be located above the frame upper portion 31a. In this case, for example, the vent pipe 100 is attachable to and detachable from the fixed gas pipe 61. While the vehicle body 32 is moving, the vent pipe 100 detached from the fixed gas pipe 61 may be supported by the frame 31 or the vehicle body 32.

A vent valve 101 is located at the vent pipe 100. The vent valve 101 opens and closes a passage formed by the vent pipe 100. Moreover, a heating device 102 is located at a portion of the vent pipe 100 which is located between the vent valve 101 and a portion of the vent pipe 100 which is connected to the fixed gas pipe 61. The heating device 102 heats the guided liquid hydrogen or the hydrogen gas generated by the evaporation of the liquid hydrogen. The heating device 102 is located in the heating device arrangement region 44 (see FIGS. 2A and 2B). In the present embodiment, the heating device 102 includes a heat exchange structure that performs heat exchange between outside air and an inside cryogenic fluid. For example, the heat exchange structure is configured as a tube body formed in a bellows shape so as to heat the inside cryogenic fluid by the heat exchange with the outside air. The configuration of the heating device 102 is not limited to this. For example, as a cooling medium that performs heat exchange with the inside cryogenic fluid, the heating device 102 may use a cooling medium, such as hot water, other than air. The heating device 102 corresponds to a heater.

Moreover, a backflow preventer 103 is connected to a portion of the vent pipe 100 which is located between the vent valve 101 and the discharge port 100a. The backflow preventer 103 prevents atmospheric air from flowing into the vent pipe 100 through the discharge port 100a. The backflow preventer 103 includes a nitrogen gas cylinder and supplies the nitrogen gas to the portion of the vent pipe 100 which is located between the vent valve 101 and the discharge port 100a. For example, when the vent valve 101 is in an open state, the backflow preventer 103 supplies the nitrogen gas to the vent pipe 100 and maintains positive pressure in the vent pipe 100. With this, atmospheric air is prevented from flowing into the vent pipe 100 through the discharge port 100a by the positive pressure in the vent pipe 100. The nitrogen gas cylinder of the backflow preventer 103 may be located in the cylinder arrangement region 45.

Emergency Release System

Figure 4:
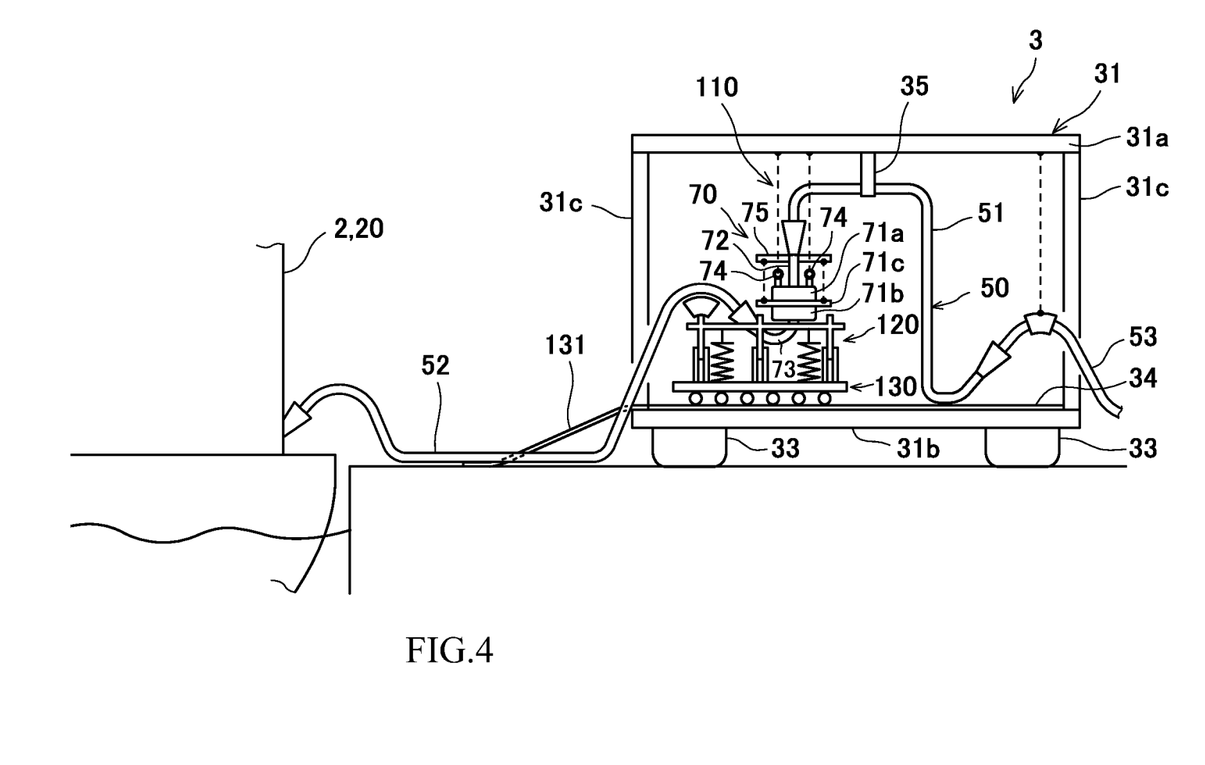
FIG. 4 is a diagram for explaining an emergency release system of the portable cargo handling equipment shown in FIG. 1 and is a diagram showing a state of the emergency release system while liquid hydrogen is transferred.
Figure 6:
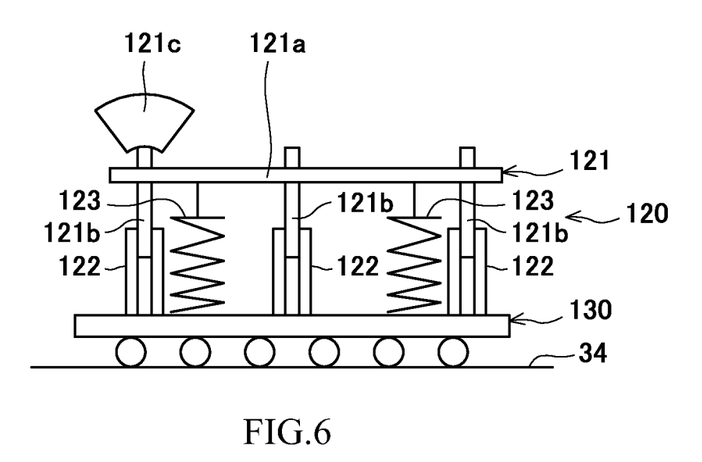
FIG. 6 is an enlarged view showing an impact absorbing device and a mover shown in FIG. 4.
Figure 7:
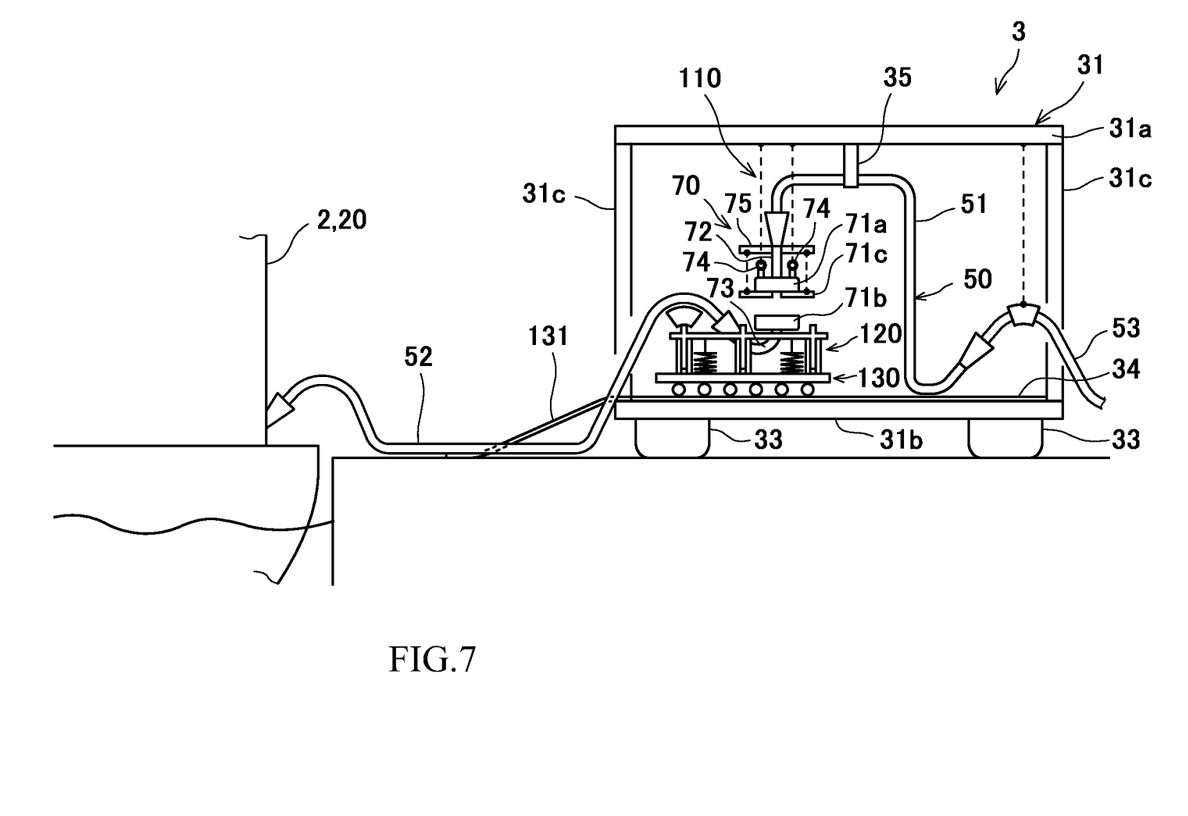
FIG. 7 is a diagram for explaining the emergency release system of the portable cargo handling equipment shown in FIG. 1 and is a diagram showing a state of the emergency release system immediately after a first emergency release coupling is uncoupled.
Figure 8:
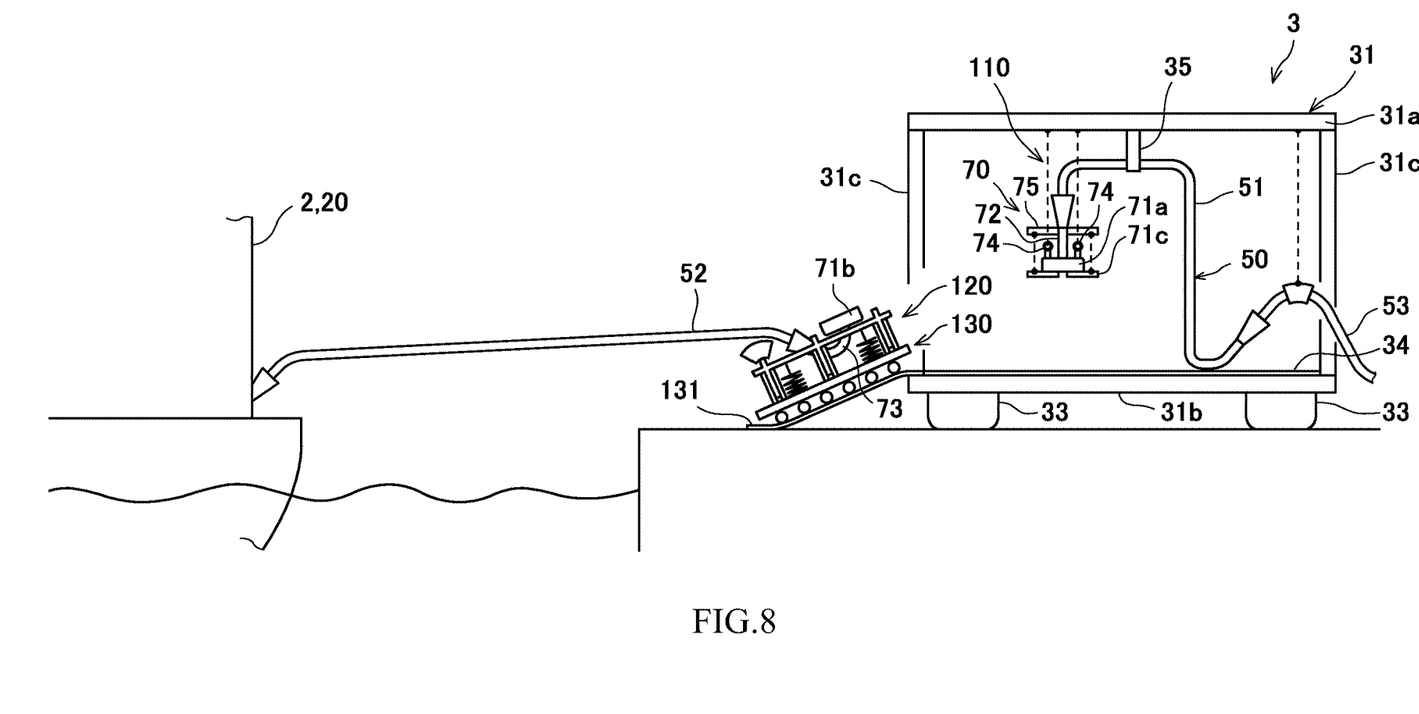
FIG. 8 is a diagram for explaining the emergency release system of the portable cargo handling equipment shown in FIG. 1 and is a diagram showing a state of the emergency release system when a ship moves in a direction away from a shore after the first emergency release coupling is uncoupled.

The portable cargo handling equipment 3 includes an emergency release system. The configuration of the emergency release system will be described with reference to FIGS. 4 to 6. In FIG. 4 and FIGS. 7 and 8 described later, components which are not related to the explanation of the emergency release system are not shown. Moreover, the hydrogen gas pipe 60 and the second emergency release unit 80 are respectively the same in structure as the liquid hydrogen pipe 50 and the first emergency release unit 70. Therefore, in FIGS. 4 to 8, only components which are related to the liquid hydrogen pipe 50 and the first emergency release unit 70 are shown. Hereinafter, the liquid hydrogen pipe 50 and the first emergency release unit 70 will be described, and the explanations of the hydrogen gas pipe 60 and the second emergency release unit 80 are omitted.

Figure 5:
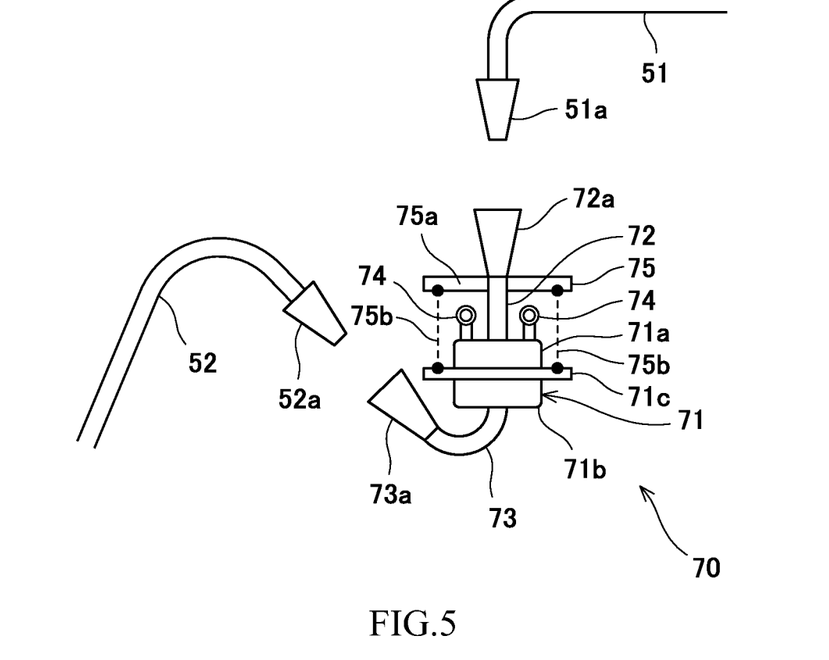
FIG. 5 is an enlarged view showing a first emergency release unit that is disconnected from a fixed liquid pipe and a hose.

FIG. 4 is a diagram for explaining the emergency release system of the portable cargo handling equipment 3 shown in FIG. 1 and is a diagram showing a state of the emergency release system while the liquid hydrogen is transferred. FIG. 5 is an enlarged view showing the first emergency release unit 70 that is disconnected from the fixed liquid pipe 51 and the hose 52. In addition to the first emergency release unit 70 and the second emergency release unit 80, the emergency release system of the portable cargo handling equipment 3 includes a lifting device 110, an impact absorbing device 120, and a mover 130. The first emergency release unit 70, the second emergency release unit 80, the lifting device 110, the impact absorbing device 120, and the mover 130 are located in the emergency release coupling arrangement region 43. The impact absorbing device corresponds to an impact absorber. The lifting device 110 corresponds to a lifter.

As shown in FIGS. 4 and 5, the first emergency release coupling 71 is located such that the second unit 71b separated from the first unit 71a falls by its own weight. As shown in FIGS. 4 and 5, a portion of the fixed liquid pipe 51 which is located in the vicinity of the joint 51a extends downward. The first emergency release unit 70 is connected to and supported by the fixed liquid pipe 51 with the first unit 71a located at an upper side of the second unit 71b.

The lifting device 110 is used when connecting the first emergency release unit 70 to the fixed liquid pipe 51 or when separating the first emergency release unit 70 from the fixed liquid pipe 51. When connecting the first emergency release unit 70 to the fixed liquid pipe 51, the lifting device 110 lifts the first emergency release unit 70 from a position close to the frame lower portion 31b or a road surface to such a position that the first emergency release unit 70 can be connected to the joint 51a of the fixed liquid pipe 51. For example, the lifting device 110 is fixed to the frame lower portion 31b or the vehicle body 32. For example, the lifting device 110 is a winch. The lifting device 110 lifts the first emergency release unit 70 such that the first emergency release unit 70 is suspended from the frame upper portion 31a. As shown in FIG. 5, the first unit 71a includes a connected portion 74 to which a rope of the lifting device 110 is connected. The lifting device 110 does not have to be a winch and may be a jack.

The first pipe 72 extends upward from the first unit 71a. The second pipe 73 extends downward from the second unit 71b and curves in an U shape. A clamp supporting portion 75 supporting the clamp 71c is fixed to the first pipe 72. In the present embodiment, the clamp supporting portion 75 includes: a supporting body 75a fixed to the first pipe 72; and a wire 75b coupling the supporting body 75a and the clamp 71c. The clamp supporting portion 75 prevents the clamp 71c from falling when the first emergency release coupling 71 is uncoupled.

The impact absorbing device 120, the mover 130, and the liquid receiver 34 are located under the first emergency release coupling 71 and the second emergency release coupling 81. FIG. 6 is an enlarged view showing the impact absorbing device 120 and the mover 130 shown in FIG. 4. The impact absorbing device 120 absorbs falling impact of the second unit 71b and the fourth unit 81b. The impact absorbing device 120 includes a unit support 121, a support guide 122, and an impact absorbing member 123.

The unit support 121 supports the second unit 71b after the first emergency release coupling 71 is uncoupled. The support guide 122 guides the unit support 121 such that the unit support 121 can slide in the upper-lower direction. For example, the unit support 121 includes: a contact portion 121a which contacts the second unit 71b or the second pipe 73 at least after the first emergency release coupling 71 is uncoupled; and one or more rod-shaped slide portions 121b fixed to the contact portion 121a. The support guide 122 includes one or more holes which are open at least upward and into which the one or more rod-shaped slide portions 121b are inserted. The support guide 122 is fixed to the mover 130. Moreover, the unit support 121 includes a hose supporting portion 121*c* that supports the hose 52 from below before and after the first emergency release coupling 71 is uncoupled.

The impact absorbing member 123 supports the contact portion 121*a* from below and elastically deforms to absorb impact generated by the falling of the second unit 71*b* and the fourth unit 81*b*. The impact absorbing member 123 is, for example, a spring. The impact absorbing member 123 may be a cushion or the like. The impact absorbing member 123 is fixed to the mover 130.

The mover 130 can move the impact absorbing device 120. The mover 130 supports the second unit 71*b*, which has been separated from the first unit 71*a*, through the impact absorbing device 120. Moreover, the mover 130 realizes the movement of the separated second unit 71*b* relative to the frame 31. To be specific, even when the separated second unit 71*b* is pulled by the hose 52 in accordance with the movement of the ship 2, the second unit 71*b* can smoothly move by the mover 130 in the horizontal direction toward the ship 2.

In the present embodiment, the mover 130 is at least one cart. As shown in FIG. 4, while the liquid hydrogen is handled, a slope 131 on which the mover 130 can travel is located between the road surface and a placement surface where the mover 130 is placed, so as to extend between the road surface and the placement surface. While the portable cargo handling equipment 3 is moving, the mover 130 is locked by a predetermined locking means so as not to be movable relative to the frame 31. Then, when starting handling the liquid hydrogen by using the portable cargo handling equipment 3 or when the first emergency release coupling 71 is uncoupled, the locking means is unlocked, and the mover 130 can move relative to the frame 31.

The impact absorbing device 120 may be configured as one structure or may be configured as structures that are separated from each other. Moreover, the mover 130 may be configured as one structure or may be configured as structures that are separated from each other. For example, the mover 130 may be one cart that supports both the second unit 71*b* and the fourth unit 81*b* or may be two carts that respectively support the second unit 71*b* and the fourth unit 81*b*.

The mover 130 is located on the liquid receiver 34. The liquid receiver 34 receives the liquid air which may be generated in the vicinity of the first emergency release coupling 71 and the second emergency release coupling 81. To be specific, the first emergency release coupling 71 has a shutoff function that prevents a fluid from leaking when the first emergency release coupling 71 is uncoupled, and the second emergency release coupling 81 has a shutoff function that prevents a fluid from leaking when the second emergency release coupling 81 is uncoupled. However, the liquid hydrogen may slightly leak while the first emergency release coupling 71 and the second emergency release coupling 81 are operating. If the liquid hydrogen leaks, air in the vicinity of the first emergency release coupling 71 and the second emergency release coupling 81 may be cooled, and this may generate the liquid air. Even in this case, since the liquid receiver 34 receives the generated liquid air, the other members included in the portable cargo handling equipment 3, the road surface where the portable cargo handling equipment 3 is placed, and the like can be prevented from being damaged by the liquid air. The liquid receiver 34 is a pan or a plate made of stainless steel. The liquid receiver 34 is supported by, for example, the vehicle body 32 or the frame lower portion 31*b*.

Method of Transferring Liquid Hydrogen

Next, a method of transferring the liquid hydrogen by using the portable cargo handling equipment 3 will be described. The transferring method described below is a method of transferring the liquid hydrogen from the land-side cryogenic tank 10 to the ship-side cryogenic tank 20.

First, the portable cargo handling equipment 3 is coupled to the land-side cryogenic tank 10 and the ship-side cryogenic tank 20. Specifically, the ship 2 is moored at a port, and the tank truck 1 is located on land close to a moored position of the ship 2. Moreover, the portable cargo handling equipment 3 is located on land close to the tank truck 1. Then, as shown in FIG. 1, the portable cargo handling equipment 3 is located between the land-side cryogenic tank 10 and the ship-side cryogenic tank 20.

To be specific, the hose 52, the hose 53, the hose 62, and the hose 63 are taken out from the hose arrangement region 42. Then, the hose 52 is connected to the first emergency release unit 70 and the ship-side liquid pipe 21. The hose 53 is connected to the fixed liquid pipe 51 and the land-side liquid pipe 11. The hose 62 is connected to the second emergency release unit 80 and the ship-side gas pipe 22. The hose 63 is connected to the fixed gas pipe 61 and the land-side gas pipe 12. As above, according to the portable cargo handling equipment 3 that is a traveling vehicle, the liquid hydrogen pipe 50 can be connected to the ship-side liquid pipe 21 and the land-side liquid pipe 11 with the liquid hydrogen pipe 50 fixed to the frame 31, and the hydrogen gas pipe 60 can be connected to the ship-side gas pipe 22 and the land-side gas pipe 12 with the hydrogen gas pipe 60 fixed to the frame 31.

Next, air in the pipes is purged with the nitrogen gas. Specifically, first, in the piping system for the liquid hydrogen, the cylinder on-off valve 91*a*, the purge gas closing valve 55, the on-off valve 13*a*, the purge gas closing valve 65, and the vent valve 101 are set to an open state, and the valves other than these valves are set to a closed state. Then, the nitrogen gas is supplied by the nitrogen gas supply source 91. With this, air in the pipes of a portion of the piping system for the liquid hydrogen which is located at the land side of the nitrogen gas supply source 91 and the vent pipe 100 is discharged through the vent pipe 100.

Moreover, in the piping system for the liquid hydrogen, the cylinder on-off valve 91*a*, the shutoff valve 54, the on-off valve 23*a*, the purge gas closing valve 64, and the vent valve 101 are set to an open state, and the valves other than these valves are set to a closed state. Then, the nitrogen gas is supplied by the nitrogen gas supply source 91. With this, air in the pipes of a portion of the piping system for the liquid hydrogen which is located at the ship side of the nitrogen gas supply source 91 and the vent pipe 100 is discharged through the vent pipe 100.

Next, the nitrogen gas in the pipes is purged with the hydrogen gas. Specifically, first, in the piping system for the liquid hydrogen, the cylinder on-off valve 92*a*, the purge gas closing valve 55, the on-off valve 13*a*, the purge gas closing valve 65, and the vent valve 101 are set to an open state, and the valves other than these valves are set to a closed state. Then, the hydrogen gas is supplied by the hydrogen gas supply source 92. With this, the nitrogen gas in the pipes of a portion of the piping system for the liquid hydrogen which is located at the land side of the hydrogen gas supply source 92 and the vent pipe 100 is discharged through the vent pipe 100.

Moreover, in the piping system for the liquid hydrogen, the cylinder on-off valve 92*a*, the shutoff valve 54, the on-off valve 23*a*, the purge gas closing valve 64, and the vent valve 101 are set to an open state, and the valves other than these valves are set to a closed state. Then, the hydrogen gas is supplied by the hydrogen gas supply source 92. With this, the nitrogen gas in the pipes of a portion of the piping system for the liquid hydrogen which is located at the ship side of the hydrogen gas supply source 92 and the vent pipe 100 is discharged through the vent pipe 100.

Next, the liquid hydrogen is transferred from the land-side cryogenic tank 10 to the ship-side cryogenic tank 20. Specifically, first, in the piping system for the liquid hydrogen, the shutoff valve 11a, the purge gas closing valve 55, the shutoff valve 54, the shutoff valve 21a, the boil off gas closing valve 22a, the purge gas closing valve 64, and the vent valve 101 are set to an open state, and the valves other than these valves are set to a closed state.

Then, the on-off valve 15 is opened, and the liquid hydrogen is guided from the liquid phase portion of the land-side cryogenic tank 10 through the circulation pipe 14 to the evaporator 16. Then, the guided liquid hydrogen is evaporated by the evaporator 16. The hydrogen gas generated by the evaporator 16 returns to the gas phase portion of the land-side cryogenic tank 10 through the circulation pipe 14. Thus, the gas pressure in the gas phase portion of the land-side cryogenic tank 10 is increased. Moreover, while the liquid hydrogen is supplied to the ship-side cryogenic tank 20, the hydrogen gas generated by the evaporation of the liquid hydrogen in the ship-side cryogenic tank 20 can be discharged through the ship-side gas pipe 22, the hydrogen gas pipe 60, and the vent pipe 100. Therefore, the gas pressure of the gas phase portion of the land-side cryogenic tank 10 can be set to be higher than the gas pressure of the gas phase portion of the ship-side cryogenic tank 20, and therefore, the liquid hydrogen can be supplied from the land-side cryogenic tank 10 to the ship-side cryogenic tank 20 by the gas pressure of the gas phase portion of the land-side cryogenic tank 10.

Flow of Emergency Release

Next, the flow of the emergency release by the emergency release system of the portable cargo handling equipment 3 will be described with reference to FIGS. 4, 7, and 8.

As shown in FIG. 4, while the liquid hydrogen is transferred, the first unit 71a is in connection with the second unit 71b in the first emergency release unit 70. In the second emergency release unit 80, the third unit 81a is in connection with the fourth unit 81b.

In an emergency, such as when strong wind, a tsunami, or an earthquake occurs while the liquid hydrogen is transferred, first, the shutoff valve 11a, the shutoff valve 54, the shutoff valve 21a, and the boil off gas closing valve 22a are closed. Then, the first emergency release coupling 71 and the second emergency release coupling 81 start being uncoupled. With this, as shown in FIG. 7, the second unit 71b and the fourth unit 81b fall by their own weights and are supported by the impact absorbing device 120.

Then, as shown in FIG. 8, when the ship 2 moves in a direction away from a shore, the second unit 71b and the fourth unit 81b are pulled by the hoses 52 and 62 to move in a movement direction of the ship 2 together with the mover 130. The first unit 71a and the third unit 81a remain connected to the fixed liquid pipe 51 and the fixed gas pipe 61, respectively. Therefore, the joints 51a and 72a are timely disconnected, and the joints 61a and 82a are timely disconnected. The first unit 71a and the third unit 81a are lowered by the lifting device 110.

As described above, in the present embodiment, while the liquid hydrogen is supplied from the land-side cryogenic tank 10 to the ship-side cryogenic tank 20, the hydrogen gas generated by the evaporation of the liquid hydrogen in the ship-side cryogenic tank 20 can be discharged to the atmosphere through the ship-side gas pipe 22, the hydrogen gas pipe 60, and the vent pipe 100. To be specific, the hydrogen gas generated in the ship-side cryogenic tank 20 can be discharged to the atmosphere at the portable cargo handling equipment 3.

Moreover, the first emergency release coupling 71 is located at the liquid hydrogen pipe 50, and the second emergency release coupling 81 is located at the hydrogen gas pipe 60. Therefore, when the ship 2 moves due to a sudden blast of wind, the first and second emergency release couplings 71 and 81 are uncoupled, and therefore, the ship 2 and the portable cargo handling equipment 3 can be separated from each other.

Furthermore, the pressure of the gas phase in the ship-side cryogenic tank 20 is released by discharging the hydrogen gas from the ship-side cryogenic tank 20. Therefore, the liquid hydrogen can be supplied by pressure from the land-side cryogenic tank 10 to the ship-side cryogenic tank 20 with small power.

The boiling point (about −253° C.) of the liquid hydrogen is lower than the boiling point (about −196° C.) of nitrogen and the boiling point (about −183° C.) of oxygen. When cryogenic hydrogen gas generated by the evaporation of the liquid hydrogen is discharged from the vent pipe 100, air may be cooled by the hydrogen gas, and this may generate the liquid air. In the present embodiment, the hydrogen gas can be heated by the heating device 102 located at the vent pipe 100. Therefore, the liquid air can be prevented from being generated in the vicinity of the discharge port 100a of the vent pipe 100.

Moreover, in the present embodiment, while the liquid hydrogen is transferred, the first unit 71a of the first emergency release coupling 71 and the third unit 81a of the second emergency release coupling 81 are supported by the frame 31 through the fixed liquid pipe 51 and the fixed gas pipe 61. Therefore, peripheral equipment related to these emergency release couplings 71 and 81 can be located in the vicinity of the frame 31 or can be supported by the frame 31.

Moreover, in the present embodiment, the liquid receiver 34 can receive the liquid air falling from the vicinities of the first and second emergency release couplings 71 and 81 when the first and second emergency release couplings 71 and 81 are uncoupled. Therefore, the other members included in the portable cargo handling equipment 3, the road surface where the portable cargo handling equipment 3 is placed, and the like can be prevented from being damaged by the liquid air.

Moreover, in the present embodiment, the first emergency release unit 70 and the second emergency release unit 80 are respectively attachable to and detachable from the fixed liquid pipe 51 and the fixed gas pipe 61. Therefore, the first emergency release unit 70 and the second emergency release unit 80 can be conveyed separately from other components, such as the frame 31 of the portable cargo handling equipment 3. With this, the maintenance of the first emergency release coupling 71 and the second emergency release coupling 81 can be easily performed. The conveyance of the first emergency release coupling 71 and the second emergency release coupling 81 to a factory and the inspection and part replacement of the first emergency release coupling 71 and the second emergency release coupling 81 at a conveyance destination can be easily performed.

Moreover, in the present embodiment, the lifting device 110 can lift the first emergency release unit 70 and the second emergency release unit 80 to such positions that the first emergency release unit 70 and the second emergency release unit 80 can be respectively connected to the joint 51*a* of the fixed liquid pipe 51 and the joint 61*a* of the fixed gas pipe 61. Therefore, work of respectively connecting the first emergency release unit 70 and the second emergency release unit 80 to the fixed liquid pipe 51 and the fixed gas pipe 61 is facilitated.

Moreover, in the present embodiment, the impact absorbing device 120 absorbs the falling impact of the second unit 71*b* and the fourth unit 81*b*. Therefore, the second unit 71*b* and the fourth unit 81*b* can be prevented from being damaged by the falling impact when the first emergency release coupling 71 and the second emergency release coupling 81 are uncoupled.

Moreover, in the present embodiment, the separated second unit 71*b* and the separated fourth unit 81*b* can be prevented by the mover 130 from being dragged on the supporting surface supporting the second unit 71*b* and the fourth unit 81*b*.

Moreover, in the present embodiment, the shutoff valve 54 is located at a position which is located lower than the discharge port 100*a* of the vent pipe 100 and away by five meters or more in the horizontal direction from the discharge port 100*a* in a top view. Therefore, the operator can operate the shutoff valve 54 at a position away from the discharge port 100*a*.

Moreover, in the present embodiment, since the portable cargo handling equipment 3 is a traveling vehicle including a traveling driving source, the portable cargo handling equipment 3 can be freely moved to a desired place.

OTHER EMBODIMENTS

The present disclosure is not limited to the above embodiment, and various modifications may be made within the scope of the present disclosure.

For example, in the piping system, the diameters and rigidity of the pipes, the positions of the devices located at the pipes, and the connection portions between the pipes are not limited to those described in the above embodiment.

Moreover, in the above embodiment, the regions 41 to 46 are defined as the internal region of the frame 31. However, the positions of various devices and pipes included in the portable cargo handling equipment 3 are suitably changeable.

Moreover, in the above embodiment, the liquid receiver 34 is located in the vicinity of the lower portions of the emergency release coupling arrangement region 43, the heating device arrangement region 44, and the operating device arrangement region 46. However, the liquid receiver 34 may be located only in the vicinity of the lower portion of the emergency release coupling arrangement region 43. Moreover, the liquid receiver 34 may be located in the vicinity of the lower portion of the vent pipe arrangement region 41 in addition to the vicinity of the lower portion of the emergency release coupling arrangement region 43.

In the above embodiment, the first emergency release coupling 71 and the second emergency release coupling 81 are located such that the second unit 71*b* separated from the first unit 71*a* and the fourth unit 81*b* separated from the third unit 81*a* fall by their own weights. However, the first emergency release coupling 71 and the second emergency release coupling 81 may be located such that the second unit 71*b* connected to the first unit 71*a* and the fourth unit 81*b* connected to the third unit 81*a* are supported from below. In this case, the impact absorbing device 120 does not have to be located under the first emergency release coupling 71 and the second emergency release coupling 81.

Moreover, in the above embodiment, the mover 130 is a cart. However, the mover 130 may be a belt conveyor that does not include a driving source. Moreover, the portable cargo handling equipment does not have to include a mover.

Moreover, in the above embodiment, the purge gas supply device 90 can selectively supply the nitrogen gas and the hydrogen gas as the purge gas to the liquid hydrogen pipe 50. However, the configuration of the purge gas supply device 90 is not limited to this. For example, the purge gas supply device 90 may be able to supply a helium gas to the liquid hydrogen pipe 50 as the purge gas with which air is purged.

Moreover, in the above embodiment, each of the shutoff valve 54 and the purge gas closing valves 55, 64, and 65 is a manual operation valve including an operating lever or an operating handle which is directly operated by the operator. However, each of the shutoff valve 54 and the purge gas closing valves 55, 64, and 65 may be a pneumatic drive valve, a hydraulic drive valve, or an electric drive valve.

Moreover, as the method of transferring the liquid hydrogen by using the portable cargo handling equipment 3, the above embodiment has described an example in which the liquid hydrogen is transferred from the land-side cryogenic tank 10 to the ship-side cryogenic tank 20. However, the present disclosure is also applicable to a case where the liquid hydrogen is transferred from the ship-side cryogenic tank 20 to the land-side cryogenic tank 10.

Moreover, the lifting device 110, the impact absorbing device 120, the mover 130, and the configuration in which the first emergency release unit 70 is attachable to and detachable from the fixed liquid pipe 51, which are described in the above embodiment, are applicable to portable cargo handling equipment which does not include the hydrogen gas pipe 60, the vent pipe 100, the second emergency release coupling 81, and the like.

Portable cargo handling equipment for liquid hydrogen according to one aspect of the present disclosure is portable cargo handling equipment for liquid hydrogen which transfers the liquid hydrogen stored in a land-side cryogenic tank to a ship-side cryogenic tank. The portable cargo handling equipment includes: a liquid hydrogen pipe through which the liquid hydrogen is guided and which includes a first joint connectable to an end portion of a ship-side liquid pipe extending from the ship-side cryogenic tank and a second joint connectable to an end portion of a land-side liquid pipe extending from the land-side cryogenic tank; a first emergency release coupling located at the liquid hydrogen pipe; a hydrogen gas pipe through which a hydrogen gas generated by evaporation of the liquid hydrogen is guided and which includes a third joint connectable to an end portion of a ship-side gas pipe extending from the ship-side cryogenic tank; a second emergency release coupling located at the hydrogen gas pipe; and a vent pipe including one end connected to the hydrogen gas pipe and the other end that is open to an atmosphere.

According to this configuration, while the liquid hydrogen is transferred from the land-side cryogenic tank to the ship-side cryogenic tank, the hydrogen gas generated by the evaporation of the liquid hydrogen in the ship-side cryogenic tank can be discharged to the atmosphere through the ship-side gas pipe, the hydrogen gas pipe, and the vent pipe. To be specific, the hydrogen gas generated in the ship-side cryogenic tank can be discharged to the atmosphere at the portable cargo handling equipment. Moreover, the first emergency release coupling and the second emergency release coupling are respectively located at the liquid hydrogen pipe and the hydrogen gas pipe. Therefore, for example, when the ship moves due to a sudden blast of wind, the first and second emergency release couplings are uncoupled, and therefore, the ship and the portable cargo handling equipment can be separated from each other.

The above portable cargo handling equipment may further include a heating device located at the vent pipe. According to this configuration, the generation of the liquid air in the vicinity of the discharge port of the vent pipe can be suppressed.

The above portable cargo handling equipment may further include a frame supporting the liquid hydrogen pipe and the hydrogen gas pipe. The first emergency release coupling may include a first coupling located at a land side and a second coupling located at a ship side and separably connected to the first coupling. The second emergency release coupling may include a third coupling located at the land side and a fourth coupling located at the ship side and separably connected to the third coupling. The first coupling and the third coupling may be supported by the frame while being connected to the second coupling and the fourth coupling, respectively. Therefore, peripheral equipment related to the first and second emergency release couplings can be located in the vicinity of the frame or can be supported by the frame.

In the above portable cargo handling equipment, at least a portion of the liquid hydrogen pipe which is located between the first emergency release coupling and the first joint may include a first flexible hose, and at least a portion of the hydrogen gas pipe which is located between the second emergency release coupling and the third joint may include a second flexible hose.

The above portable cargo handling equipment may further include a liquid receiver located under the first emergency release coupling and the second emergency release coupling. According to this configuration, the other members included in the portable cargo handling equipment, the road surface where the portable cargo handling equipment is placed, and the like can be prevented from being damaged by the liquid air.

In the above portable cargo handling equipment, the liquid hydrogen pipe may include a fixed liquid pipe fixed to the frame, a first hose including the first flexible hose, and a first emergency release assembly including the first emergency release coupling, a fourth joint connectable to an end portion of the fixed liquid pipe, and a fifth joint connectable to an end portion of the first hose, and the hydrogen gas pipe may include a fixed gas pipe fixed to the frame, a second hose including the second flexible hose, and a second emergency release assembly including the second emergency release coupling, a sixth joint connectable to an end portion of the fixed gas pipe, and a seventh joint connectable to an end portion of the second hose. According to this configuration, the first emergency release assembly and the second emergency release assembly can be conveyed separately from other components, such as the frame of the portable cargo handling equipment. With this, the maintenance of the first emergency release coupling and the second emergency release coupling can be easily performed. The conveyance of the first emergency release coupling and the second emergency release coupling to a factory and the inspection and part replacement of the first emergency release coupling and the second emergency release coupling at a conveyance destination can be easily performed.

In the above portable cargo handling equipment, the frame may include a frame upper portion located above the first emergency release coupling and the second emergency release coupling and a frame lower portion located under the first emergency release coupling and the second emergency release coupling. The end portion of the fixed liquid pipe and the end portion of the fixed gas pipe may be located higher than the frame lower portion. The portable cargo handling equipment may further include a lifting device that lifts the first emergency release assembly and the second emergency release assembly to such positions that the first emergency release assembly and the second emergency release assembly are connectable to the end portion of the fixed liquid pipe and the end portion of the fixed gas pipe, respectively. The lifting device can lift the first emergency release assembly and the second emergency release assembly to such positions that the first emergency release assembly and the second emergency release assembly can be respectively connected to the joint of the fixed liquid pipe and the joint of the fixed gas pipe. Therefore, work of respectively connecting the first emergency release assembly and the second emergency release assembly to the fixed liquid pipe and the fixed gas pipe is facilitated.

In the above portable cargo handling equipment, the first emergency release coupling may be located such that the second coupling separated from the first coupling falls by its own weight, and the second emergency release coupling may be located such that the fourth coupling separated from the third coupling falls by its own weight. The portable cargo handling equipment may further include an impact absorber that absorbs falling impact of the second coupling and the fourth coupling. According to this configuration, the second coupling and the fourth coupling can be prevented from being damaged by the falling impact when the first emergency release coupling and the second emergency release coupling are uncoupled.

The above portable cargo handling equipment may further include a mover which supports the second coupling separated from the first coupling and the fourth coupling separated from the third coupling and realizes movements of the second coupling and the fourth coupling relative to the frame. According to this configuration, the separated second coupling and the separated fourth coupling can be prevented by the mover from being dragged on the supporting surface supporting the second coupling and the fourth coupling.

In the above portable cargo handling equipment, a shutoff valve that is manually operated may be located at a portion of the liquid hydrogen pipe which is located between the second joint and the first emergency release coupling, and the shutoff valve may be located at a position that is lower than a discharge port of the vent pipe and away by five meters or more in a horizontal direction from the discharge port in a top view. According to this configuration, the operator can operate the shutoff valve at a position away from the discharge port.

The above portable cargo handling equipment may further include: a frame supporting the liquid hydrogen pipe and the hydrogen gas pipe; a vehicle body supporting the frame; and a traveling driving source supported by the vehicle body. The portable cargo handling equipment may be a traveling vehicle. The portable cargo handling equipment can be freely moved to a desired position.

The invention claimed is:
1. Portable cargo handling equipment for liquid hydrogen, the portable cargo handling equipment transferring the liquid hydrogen stored in a land-side cryogenic tank to a ship-side cryogenic tank,
the portable cargo handling equipment comprising:
a liquid hydrogen pipe through which the liquid hydrogen is guided and which includes a first joint connectable to an end portion of a ship-side liquid pipe extending from the ship-side cryogenic tank and
a second joint connectable to an end portion of a land-side liquid pipe extending from the land-side cryogenic tank;
a first emergency release coupling located at the liquid hydrogen pipe;
a hydrogen gas pipe through which a hydrogen gas generated by evaporation of the liquid hydrogen is guided and which includes a third joint connectable to an end portion of a ship-side gas pipe extending from the ship-side cryogenic tank;
a second emergency release coupling located at the hydrogen gas pipe;
a vent pipe including one end connected to the hydrogen gas pipe and the other end that is open to an atmosphere; and
a frame supporting the liquid hydrogen pipe and the hydrogen gas pipe, wherein:
the first emergency release coupling includes a first coupling located at a land side and a second coupling located at a ship side and separably connected to the first coupling;
the second emergency release coupling includes a third coupling located at the land side and a fourth coupling located at the ship side and separably connected to the third coupling;
the first coupling and the third coupling are supported by the frame while being connected to the second coupling and the fourth coupling, respectively;
at least a portion of the liquid hydrogen pipe which is located between the first emergency release coupling and the first joint includes a first flexible hose;
at least a portion of the hydrogen gas pipe which is located between the second emergency release coupling and the third joint includes a second flexible hose;
the liquid hydrogen pipe includes
a fixed liquid pipe fixed to the frame,
a first hose including the first flexible hose, and
a first emergency release assembly including the first emergency release coupling, a fourth joint connectable to an end portion of the fixed liquid pipe, and a fifth joint connectable to an end portion of the first hose;
the hydrogen gas pipe includes
a fixed gas pipe fixed to the frame,
a second hose including the second flexible hose, and
a second emergency release assembly including the second emergency release coupling, a sixth joint connectable to an end portion of the fixed gas pipe, and a seventh joint connectable to an end portion of the second hose;
the frame includes
a frame upper portion located above the first emergency release coupling and the second emergency release coupling and
a frame lower portion located under the first emergency release coupling and the second emergency release coupling; and
the end portion of the fixed liquid pipe and the end portion of the fixed gas pipe are located higher than the frame lower portion,
the portable cargo handling equipment further comprising a lifter that lifts the first emergency release assembly and the second emergency release assembly to such positions that the first emergency release assembly and the second emergency release assembly are connectable to the end portion of the fixed liquid pipe and the end portion of the fixed gas pipe, respectively.

2. The portable cargo handling equipment according to claim 1, further comprising a heater located at the vent pipe.

3. The portable cargo handling equipment according to claim 1, further comprising a liquid receiver located under the first emergency release coupling and the second emergency release coupling.

4. The portable cargo handling equipment according to claim 1, wherein:
a shutoff valve that is manually operated is located at a portion of the liquid hydrogen pipe which is located between the second joint and the first emergency release coupling; and
the shutoff valve is located at a position that is lower than a discharge port of the vent pipe and away by five meters or more in a horizontal direction from the discharge port in a top view.

5. The portable cargo handling equipment according to claim 1, further comprising:
a vehicle body supporting the frame; and
a traveling driving source supported by the vehicle body, wherein
the portable cargo handling equipment is a traveling vehicle.

6. Portable cargo handling equipment for liquid hydrogen, the portable cargo handling equipment transferring the liquid hydrogen stored in a land-side cryogenic tank to a ship-side cryogenic tank,
the portable cargo handling equipment comprising:
a liquid hydrogen pipe through which the liquid hydrogen is guided and which includes
a first joint connectable to an end portion of a ship-side liquid pipe extending from the ship-side cryogenic tank and
a second joint connectable to an end portion of a land-side liquid pipe extending from the land-side cryogenic tank;
a first emergency release coupling located at the liquid hydrogen pipe;
a hydrogen gas pipe through which a hydrogen gas generated by evaporation of the liquid hydrogen is guided and which includes a third joint connectable to an end portion of a ship-side gas pipe extending from the ship-side cryogenic tank;
a second emergency release coupling located at the hydrogen gas pipe;
a vent pipe including one end connected to the hydrogen gas pipe and the other end that is open to an atmosphere; and
a frame supporting the liquid hydrogen pipe and the hydrogen gas pipe, wherein:
the first emergency release coupling includes a first coupling located at a land side and a second coupling located at a ship side and separably connected to the first coupling;
the second emergency release coupling includes a third coupling located at the land side and a fourth coupling located at the ship side and separably connected to the third coupling;
the first coupling and the third coupling are supported by the frame while being connected to the second coupling and the fourth coupling, respectively;
the first emergency release coupling is located such that the second coupling separated from the first coupling falls by its own weight; and the second emergency release coupling is located such that the fourth coupling separated from the third coupling falls by its own weight, the portable cargo handling equipment further comprising an impact absorber that absorbs falling impact of the second coupling and the fourth coupling.

7. The portable cargo handling equipment according to claim 6, further comprising a mover that moves the impact absorber.

8. The portable cargo handling equipment according to claim 7, further comprising:
   a vehicle body supporting the frame; and
   a traveling driving source supported by the vehicle body, wherein:
   the portable cargo handling equipment is a traveling vehicle; and
   the mover is supported by the vehicle body.

9. Portable cargo handling equipment for liquid hydrogen, the portable cargo handling equipment transferring the liquid hydrogen stored in a land-side cryogenic tank to a ship-side cryogenic tank,
   the portable cargo handling equipment comprising:
   a liquid hydrogen pipe through which the liquid hydrogen is guided and which includes
      a first joint connectable to an end portion of a ship-side liquid pipe extending from the ship-side cryogenic tank and
      a second joint connectable to an end portion of a land-side liquid pipe extending from the land-side cryogenic tank;
   a first emergency release coupling located at the liquid hydrogen pipe;
   a hydrogen gas pipe through which a hydrogen gas generated by evaporation of the liquid hydrogen is guided and which includes a third joint connectable to an end portion of a ship-side gas pipe extending from the ship-side cryogenic tank;
   a second emergency release coupling located at the hydrogen gas pipe;
   a vent pipe including one end connected to the hydrogen gas pipe and the other end that is open to an atmosphere; and
   a frame supporting the liquid hydrogen pipe and the hydrogen gas pipe, wherein:
   the first emergency release coupling includes a first coupling located at a land side and a second coupling located at a ship side and separably connected to the first coupling;
   the second emergency release coupling includes a third coupling located at the land side and a fourth coupling located at the ship side and separably connected to the third coupling; and
   the first coupling and the third coupling are supported by the frame while being connected to the second coupling and the fourth coupling, respectively,
   the portable cargo handling equipment further comprising a mover which supports the second coupling separated from the first coupling and the fourth coupling separated from the third coupling and realizes movements of the second coupling and the fourth coupling relative to the frame.

10. The portable cargo handling equipment according to claim 9, further comprising:
    a vehicle body supporting the frame; and
    a traveling driving source supported by the vehicle body, wherein:
    the portable cargo handling equipment is a traveling vehicle; and
    the mover is supported by the vehicle body.

* * * * *